United States Patent [19]

Aramaki et al.

[11] Patent Number: 5,028,757
[45] Date of Patent: Jul. 2, 1991

[54] SEALING STRUCTURE FOR USE IN WIRE CUT ELECTRIC DISCHARGE MACHINING APPARATUS

[75] Inventors: Jun Aramaki; Makoto Tanaka; Shiro Imai, all of Nagoya, Japan

[73] Assignee: Mitsubishi Denki K.K., Tokyo, Japan

[21] Appl. No.: 421,435

[22] Filed: Oct. 13, 1989

[30] Foreign Application Priority Data

Oct. 17, 1988 [JP] Japan ................... 63-259593

[51] Int. Cl.$^5$ ................ B23H 1/00; B23H 7/10
[52] U.S. Cl. ............................... 219/69.12
[58] Field of Search ............... 219/69.12, 69.14

[56] References Cited

U.S. PATENT DOCUMENTS

| | | | |
|---|---|---|---|
| 4,565,915 | 1/1986 | Girardin | 219/69.12 |
| 4,647,747 | 3/1987 | Goto | 219/69.12 |
| 4,808,786 | 2/1989 | Shinkai et al. | 219/69.12 |
| 4,808,787 | 2/1989 | Futamura | 219/69.12 |
| 4,918,279 | 4/1990 | Babel et al. | 219/69.12 |

FOREIGN PATENT DOCUMENTS 60-52223 3/1985 Japan .
60-186319 9/1985 Japan .

Primary Examiner—Geoffrey S. Evans
Attorney, Agent, or Firm—Sughrue, Mion, Zinn Macpeak & Seas

[57] ABSTRACT

A sealing structure for use in a wire cut electric discharge machining apparatus for machining a workpiece in a machining solution, the machining apparatus having a machining reservoir for storing the machining solution which has a through window in a horizontal direction at side wall thereof to allow an arm for guiding a wire electrode to move in horizontal direction, the sealing structure prevents the machining solution from leaking. The sealing structure allows the arm to move smoothly in X and Y direction relative to the machining reservoir. The sealing structure comprises a covering plate for covering the through window of the reservoir, sealing member disposed between the covering plate and the reservoir, holding portion for holding the covering plate movably relative to the reservoir. The holding member includes plural bearings and an extendable bellows for surrounding the arm to prevent the machining solution from leaking.

5 Claims, 3 Drawing Sheets

SEALING STRUCTURE FOR USE IN WIRE CUT ELECTRIC DISCHARGE MACHINING APPARATUS

BACKGROUND OF THE INVENTION

The present invention relates to a wire cut electric discharge machining apparatus for machining a workpiece which is placed in a machining solution contained in a machining reservoir, and more particularly to a sealing structure for the machining solution, which is capable of preventing leakage of the machining solution during machining.

With such a wire cut discharge machining apparatus, a workpiece in a machining solution is machined by a wire electrode which is movable in X and Y directions relative to a machining reservoir. An arm for supporting the wire electrode is adapted to penetrate a side wall of the machining reservoir, so that the arm is allowed to project into the machining reservoir.

FIG. 1 is a schematic diagram illustrating an example of a conventional sealing structure in a wire cut electric discharge machining apparatus. In FIG. 1, reference numeral 1 denotes a machining reservoir; 2, a machining solution; 3, an arm passing through the side wall of the machining reservoir 1 which is movable in X and Y directions relative to the machining reservoir 1; 1a, a through window elongated in a horizontal direction and provided at the side wall of the machining reservoir 1 to allow the arm 3 and the machining reservoir 1 to move relative to each other in a direction, for example a Y direction; 4, a steel seal installed in the through window 1a; 5, a seal receiver to which the steel seal 4 is fixedly secured; 5a, a through hole formed to the seal receiver 5 so as to allow the arm 3 move in the other direction, for example an X direction, relative to the machining reservoir 1; and 6, a pipe seal for preventing the machining solution 2 from leaking through a gap between the arm 3 and the seal receiver 5. A supporting member 1c is provided along a circumference of the through window 1a to retain the steel seal 4 within a slight gap 1b formed between the supporting member 1c and the side wall of the machining reservoir 1. The steel seal is provided to minimize amount of leaked machining solution 2.

In such a conventional wire cut electric discharge machining apparatus, the steel seal 4 is urged toward the supporting member 1c in the X direction shown in FIG. 1 due to a hydraulic pressure of the machining solution 2. This results in an occurrence of a strong contacting pressure between the steel seal 4 and the supporting member 1c. Consequently, when the arm 3 moves in the Y direction relative to the machining reservoir 1, the steel seal 4 slides along the supporting member 1c with a large frictional resistance.

The arm 3 also slides in the X direction through the hole 5a with a frictional resistance between the pipe seal 6 and the arm 3. If the frictional resistance therebetween is relatively large, the resistance in the X direction causes a deformation of the arm 3 in the Y direction whereby displacement of a wire guide supported by the arm 3 is caused. As a result, it is disadvantageous that the machining accuracy may be degraded and further the frictional resistance between the pipe seal 6 and the arm 3 in the X direction may cause the steel seal 4 to be damaged.

SUMMARY OF THE INVENTION

The present invention is accomplished to eliminate the above described difficulties and drawbacks accompanying the conventional apparatus. An object of the present invention is to provide a wire cut electric discharge machining apparatus having a sealing structure for machining solution which is small in a frictional resistance occurred due to a hydraulic pressure of the machining solution, and the fractional resistance may hardly cause a supporting arm for a wire electrode to be damaged.

In order to achieve the object, the present invention provides a sealing structure for use in a wire cut electric discharge machining apparatus for machining a workpiece in a machining solution contained in a machining reservoir having a through window in a horizontal direction at a side wall thereof to allow an arm for guiding a wire electrode to move in the horizontal direction, the sealing structure comprising: a covering plate for covering the through window which has a hole to allow the arm to project into the reservoir, sealing means for preventing the machining solution from leaking, which is disposed between a circumference of the through window and the covering plate, a holding portion for holding the covering plate movably relative to the reservoir which is disposed at outside of the covering plate, a water proof means for preventing the machining solution from leaking from the hole of, the water proof means surrounding the arm and being extendable in response to movement of the arm.

When the hydraulic pressure of machining solution is applied to the machining reservoir, the covering plate is urged toward the holing portion. Therefore, the covering plate is movable in the horizontal direction by the holding portion. The water proof of the arm penetrating through the covering plate is kept by the extendable bellows so that the arm can be non-contacted to the covering plate. Consequently, the arm can move freely without the influence of deforming due to the hydraulic pressure of the machining solution.

PREFERRED EMBODIMENT OF THE INVENTION

Figure 1:
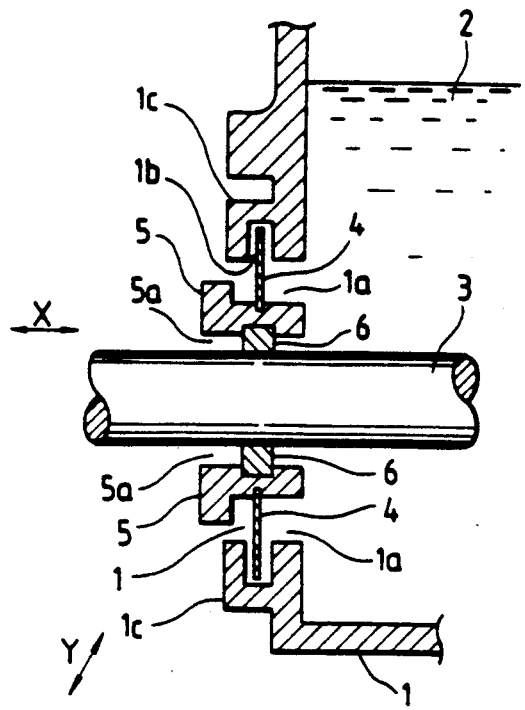
FIG. 1 is a schematic diagram illustrating a vertical cross section of the conventional seal structure for a wire cut electric discharge machining apparatus.
Figure 2:
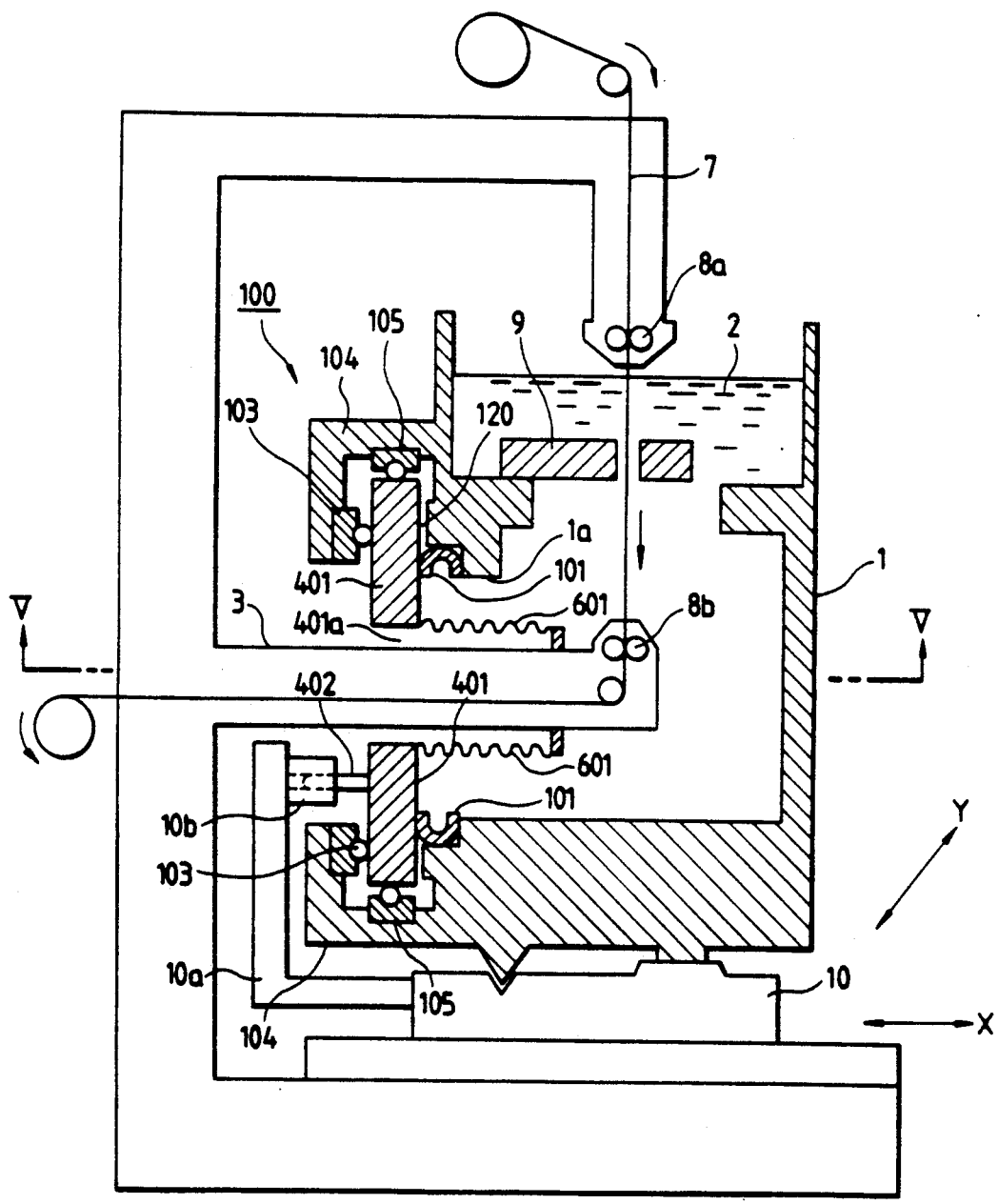
FIG. 2 is a schematic diagram illustrating a vertical cross section of an embodiment according to the present invention.
Figure 4:
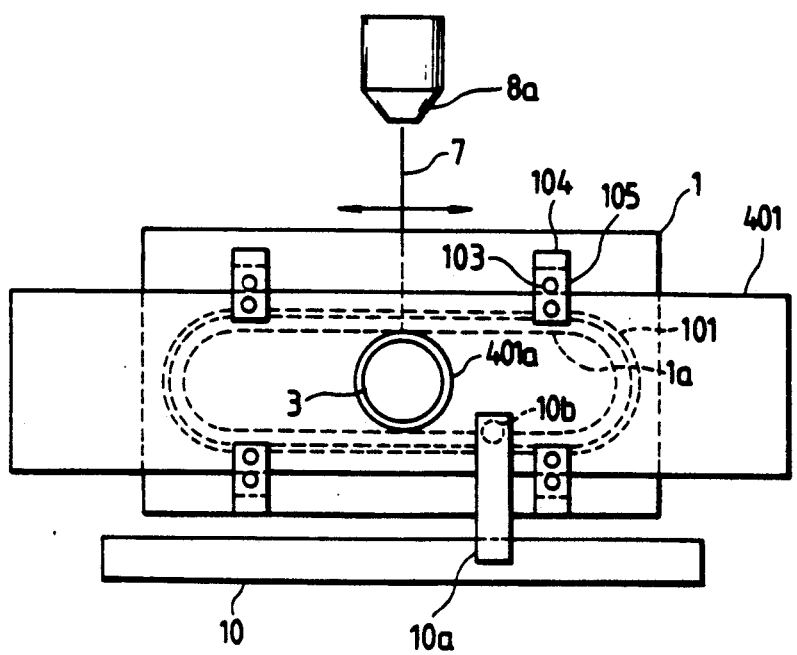
FIG. 4 is a schematic diagram illustrating a left side view of the embodiment shown in FIG. 2.

In FIG. 2, the reference numerals 1 to 6 designate the same as those in the conventional seal structure shown in FIG. 1. Reference numeral 7 denotes a wire electrode which is conveyed through an upper wire guide 8a and a lower wire guide 8b. A workpiece 9 is placed in the machining reservoir 2 which is carried on a saddle 10 which is placed on a stational basement. The saddle 10 is provided with a stopper 10a. Reference numeral 401 denotes a covering plate which is provided outside of a through window 1a formed on a side wall of the machining reservoir 1. The horizontal size of the covering plate 401 is more than twice as much as a moving range of the arm 3 in the horizontal direction. The hole 401a is provided at a center of the covering plate 401 to receive an arm 3 in such a manner that the arm 3 is allowed to extend to the inside of the machining reservoir 2 freely. A sealing member 101 is fixed to a circumference of the through window 1a of the machining reservoir 1 as shown in FIG. 4. A holding portion 100 includes bearings 103 contacting with an outer surface of the covering plate 401, bearings 105 contacting with upper and lower edge of the covering plate 401 and a supporting member 104 which is integrally formed with the machining reservoir 1 so as to support the bearings 103 and 105. The holding portion is adapted to allow the covering plate 401 to move smoothly in a Y direction. The arm 3 is movable in a Y direction together with the covering plate 401 as shown in FIG. 2. Reference numeral 601 designates an extendable bellows which is provided concentrically with the arm 3. One end of the extendable bellows 601 is fixed to the circumference of the hole 401a whereas another end thereof is fixed to the circumference of the arm 3.

The operation of the above-mentioned embodiment will be described hereinafter.

Figure 3:
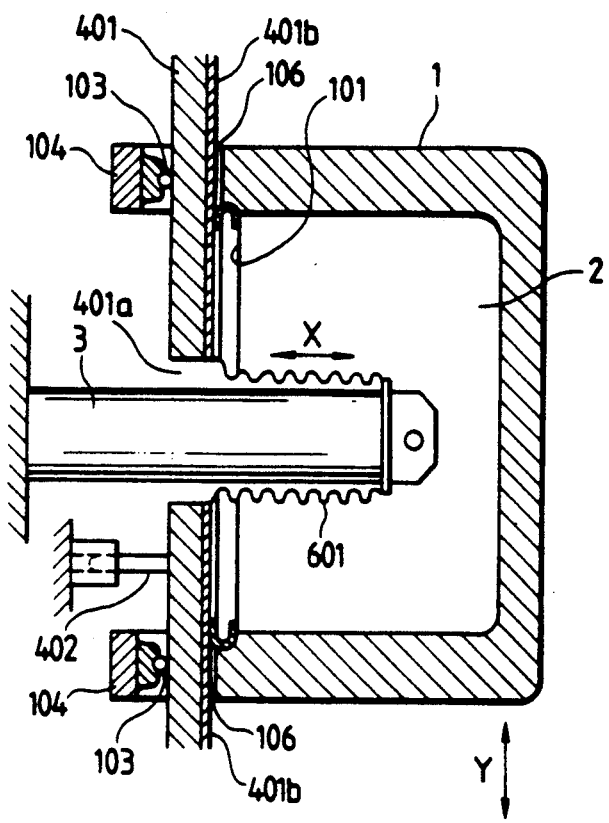
FIG. 3 is a schematic diagram illustrating a horizontal cross section taken along a line V—V in FIG. 2.

When the machining reservoir 1 is filled with the machining solution 2, the covering plate 401 is urged in a X direction by the hydraulic pressure. The bearings 103 and 105 slidably hold the covering plate 401 to maintain a slight gap between the machining reservoir 1 and the covering plate 401. The covering plate 401 slides smoothly in a Y direction due to the bearings 103 and 104. The gap is sealed by the sealing member 101 to prevent the machining solution from leaking. The arm 3 penetrates through the hole 401a of the covering plate 401 as shown in FIG. 3 with no contact to the machining reservoir 1 and the covering plate 401. The extendable bellows which is provided concentrically with the arm 3 also serves as a sealing member to prevent the machining solution 2 from leaking from the hole 401a of the covering plate 401. With such a sealing structure, the machining reservoir 1 can move smoothly in the X and Y directions relative to the arm 3 with water proof.

Further, a pin 402 is provided on the outer surface of the covering plate 401 to be coupled to a ring 10b provided at upper portion of the stopper 10a as shown in FIG. 2, so that the movement of the covering plate 401 in the Y direction relative to the arm 3 can be restricted when the machining reservoir 1 moves in the Y direction.

Furthermore, an inner surface of the covering plate 401 may be coated with a resin 401b in order to decrease a frictional resistance between the covering plate 401 and the sealing member 101, which may occur when the machining reservoir 1 moves in the Y direction relative to the covering plate 401. It is preferable to employ a fluor resin as a material for the coating resin 401b. Furthermore, it is also preferable to employ a fluor resin, e.g. a teflon resin, as a material for sealing member 101. Consequently, an abrasion of the sealing member 101 hardly occurs.

Figure 5:
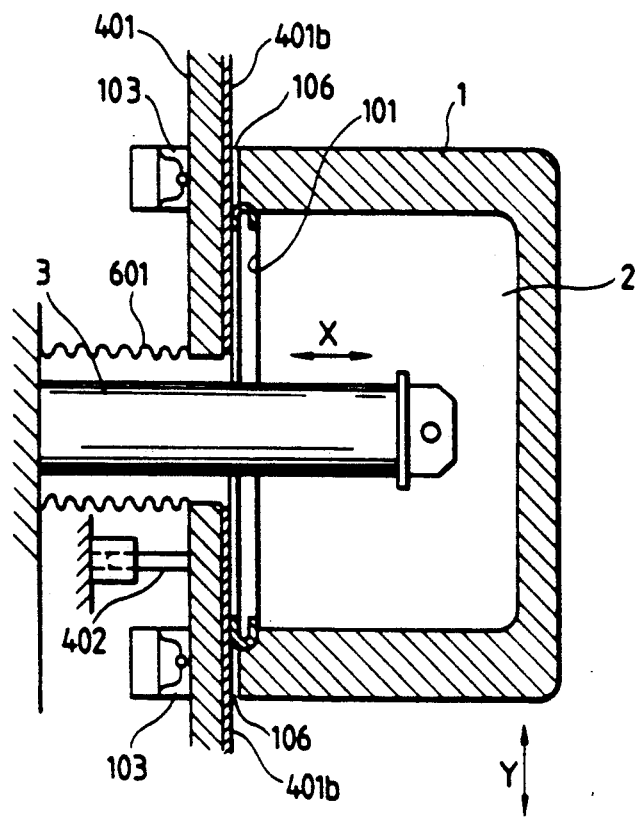
FIG. 5 is a schematic diagram illustrating a horizontal cross section of the other embodiment of the present invention.

FIG. 5 is a horizontal cross sectional view of another embodiment of the present invention. As shown in this figure, the bellows 601 may be disposed outside of the machining reservoir.

As described above, the sealing structure for the wire discharge machining apparatus according to the present invention comprises a covering plate for sealing a machining solution being slidably supported by a holding portion, an arm for supporting the wire electrode which penetrates the covering plate with non-contact thereto and an extendable bellows connected between the arm and the covering plate to prevent the machining solution from leaking from the machining reservoir. With such a construction, since the frictional resistances are decreased, the arm can freely move in the X and Y directions in the machining reservoir. As a result, the machining accuracy cab be improved.

What is claimed is:

1. A sealing structure for use in a wire cut electric discharge machining apparatus for machining a workpiece in a machining solution contained in a machining reservoir having a through window in a horizontal direction at a side wall thereof to allow an arm for guiding a wire electrode to move in the horizontal direction, said sealing structure comprising:
   a covering plate for covering said through window which has a hole to allow said arm to project into said reservoir;
   sealing means for preventing said machining solution from leaking, which is disposed between a circumference of said through window and said covering plate;
   a holding portion for holding said covering plate movably relative to the reservoir which is disposed at outside of said covering plate;
   a water proof means for preventing said machining solution from leaking from said hole, said water proof means surrounding said arm and being extendable in response to movement of said arm; and
   a pin provided on the outer surface of the covering plate; and
   a stopper fixed to a machine base having a ring to be coupled to said pin to restrict a movement of said covering plate relative to said arm.

2. A sealing structure for use in a wire cut electric discharge machining apparatus for machining a workpiece in a machining solution contained in a machining reservoir having a through window in a horizontal direction at a side wall thereof to allow an arm for guiding a wire electrode to move in the horizontal direction, said sealing structure comprising:
   a covering plate for covering said through window which has a hole to allow said arm to project into said reservoir;
   sealing means for preventing said machining solution from leaking, which is disposed between a circumference of said through window and said covering plate;
   a holding portion for holding said covering plate movably relative to the reservoir which is disposed at outside of said covering plate;
   a water proof means for preventing said machining solution from leaking from said hole, said water proof means surrounding said arm and being extendable in response to movement of said arm; and
   wherein said water proof means is engaged between a stationary basement and circumference of said hole of said covering plate.

3. A sealing structure for use in a wire cut electric discharge machining apparatus for machining a workpiece in a machining solution contained in a machining reservoir having a through window in a horizontal direction at a side wall thereof to allow an arm for guiding a wire electrode to move in the horizontal direction, said sealing structure comprising:
- a covering plate for covering said through window which has a hole to allow said arm to project into said reservoir;
- sealing means for preventing said machining solution from leaking, which is disposed between a circumference of said through window and said covering plate;
- a holding portion for holding said covering plate movably relative at the reservoir which is disposed at outside of said covering plate;
- a water proof means for preventing said machining solution from leaking from said hole, said water proof means surrounding said arm and being extendable in response to movement of said arm; and
- wherein said covering plate is coated with a resin.

4. A sealing structure as claimed in claim 3, wherein said resin is a fluor resin.

5. A sealing structure for use in a wire cut electric discharge machining apparatus for machining a workpiece in a machining solution contained in a machining reservoir having a through window in a horizontal direction at a side wall thereof to allow an arm for guiding a wire electrode to move in the horizontal direction, said sealing structure comprising:
- a covering plate for covering said through window which has a hole to allow said arm to project into said reservoir;
- sealing means for preventing said machining solution from leaking, which is disposed between a circumference of said through window and said covering plate;
- a holding portion for holding said covering plate movably relative to the reservoir which is disposed at outside of said covering plate;
- a water proof means for preventing said machining solution from leaking from said hole, said water proof means surrounding said arm and being extendable in response to movement of said arm; and
- wherein said holding portion comprises a supporting member fixed to said machining reservoir, first bearings contacting to an outer surface of said covering plate and second bearings contacting to upper and bottom edges of said covering plate, said first and second bearings being fixed to said supporting member.

* * * * *